United States Patent [19]
Alario et al.

[11] Patent Number: 6,007,700
[45] Date of Patent: Dec. 28, 1999

[54] PROCESS FOR THE CATALYST CONVERSION OF HYDROCARBONS INTO AROMATICS USING A CATALYST CONTAINING AT LEAST ONE DOPING METAL CHOSEN FROM THE GROUP CONSISTING OF TITANIUM, ZIRCONIUM, HAFNIUM, COBALT, NICKEL, ZINC, AND/OR THE LANTHANIDES

[75] Inventors: Fabio Alario, Neuilly-Sur-Seine; Jean-Marie Deves, Vernouillet; Patrick Euzen, Paris, all of France

[73] Assignee: Institut Francais Du Petrole, Rueil Malmaison, France

[21] Appl. No.: 08/973,404

[22] PCT Filed: Jun. 14, 1996

[86] PCT No.: PCT/FR96/00917

§ 371 Date: Dec. 15, 1997

§ 102(e) Date: Dec. 15, 1997

[87] PCT Pub. No.: WO97/00305

PCT Pub. Date: Jan. 3, 1997

[30] Foreign Application Priority Data

Jun. 16, 1995 [FR] France ................................ 95 07195
Jun. 16, 1995 [FR] France ................................ 95 07194

[51] Int. Cl.[6] .......................... C10G 35/085; C10G 35/09
[52] U.S. Cl. .......................... 208/139; 208/134; 208/135; 208/136; 208/137; 208/138; 585/418; 585/419; 585/420; 585/421
[58] Field of Search .................................... 208/134, 135, 208/136, 137, 138, 139; 585/418, 419, 420, 421

[56] References Cited

U.S. PATENT DOCUMENTS

| | | |
|---|---|---|
| 3,177,136 | 4/1965 | Lang et al. .............................. 208/139 |
| 3,415,737 | 12/1968 | Kluksdahl . |
| 3,700,588 | 10/1972 | Edouard et al. . |
| 3,915,845 | 10/1975 | Antos ...................................... 208/139 |
| 3,972,805 | 8/1976 | Wilheim .................................. 208/139 |
| 3,972,806 | 8/1976 | Antos ...................................... 208/139 |
| 4,032,587 | 6/1977 | Antos ...................................... 585/419 |
| 4,165,276 | 8/1979 | Antos ...................................... 208/139 |
| 4,190,557 | 2/1980 | Antos ...................................... 252/441 |
| 4,290,921 | 9/1981 | Antos ...................................... 252/441 |
| 5,227,357 | 7/1993 | Sun et al. ................................ 502/227 |
| 5,665,223 | 9/1997 | Bogdan .................................. 208/138 |

FOREIGN PATENT DOCUMENTS

| | | |
|---|---|---|
| 0034228 | 8/1981 | European Pat. Off. . |
| 0601399 | 6/1994 | European Pat. Off. . |
| 2187887 | 1/1974 | France . |
| 2280426 | 2/1976 | France . |
| 2436627 | 4/1980 | France . |
| 2481612 | 11/1981 | France . |
| 2483254 | 12/1981 | France . |
| 2659569 | 9/1991 | France . |
| 2008431 | 6/1979 | United Kingdom . |
| 2120572 | 12/1983 | United Kingdom . |
| 08973402 | 12/1997 | WIPO . |
| 08973403 | 12/1997 | WIPO . |
| 08973406 | 12/1997 | WIPO . |
| 08973407 | 12/1997 | WIPO . |

*Primary Examiner*—Walter D. Griffin
*Attorney, Agent, or Firm*—Oblon, Spivak, McClelland, Maier & Neustadt, P.C.

[57] ABSTRACT

Gasolines are reformed and parafin and naphthene hydrocarbons are converted to aromatic compounds by contacting the hydrocarbons with a catalyst comprising a matrix of $\eta$ transition alumina and $\gamma$ transition alumina. The catalyst contains at least one doping metal, at least one halogen, at least one noble metal and at least one promoter metal. The doping metals are selected from titanium, zirconium, hafnium, cobalt, nickel, zinc, and the lanthanides and the promoter metals are selected from tin, germanium, indium, gallium, thallium, antimony, lead, rhenium, manganese, chromium, molybdenum and tungsten.

23 Claims, No Drawings

PROCESS FOR THE CATALYST
CONVERSION OF HYDROCARBONS INTO
AROMATICS USING A CATALYST
CONTAINING AT LEAST ONE DOPING
METAL CHOSEN FROM THE GROUP
CONSISTING OF TITANIUM, ZIRCONIUM,
HAFNIUM, COBALT, NICKEL, ZINC, AND/
OR THE LANTHANIDES

BACKGROUND OF THE INVENTION

1. Field of the Invention

The present invention relates to a process for the catalyst conversion of hydrocarbons into aromatics which can be used in gasoline reforming processes and aromatics production processes.

More specifically, the invention relates to such process using as catalyst a catalyst comprising a matrix consisting of a mixture of η transition alumina and γ transition alumina, or in addition, at least one doping metal chosen from the group made up of titanium, zirconium, hafnium, cobalt, nickel, zinc and the lanthanides, at least one halogen, at least one noble metal and at least one promoter metal.

2. Description of the Background

Catalyst reforming is a process which can be used to obtain improved octane ratings of petroleum fractions, in particular of heavy distillation gasoline by conversion of n-paraffins and naphtenes into aromatic hydrocarbons.

Catalyst reforming therefore entails the conversion firstly of $C_7$–$C_{10}$ n-paraffins into aromatics and light paraffins, and secondly of $C_7$–$C_{10}$ naphtenes into aromatics and light paraffins. These reactions are illustrated in particular by the conversion through dehydrogenation of cyclohexanes and dehydroisomerization of alkyl cyclopentanes to give aromatics, for example methyl cyclohexane giving toluene, and by the conversion through cyclization of n-paraffins into aromatics, for example n-heptane giving toluene.

During catalytic reforming, cracking reactions of heavy n-paraffins into light paraffins also take place, leading in particular to C1–C4 products, chiefly propane and isobutane: these reactions are detrimental to the yield of reformed product.

Finally, coke formation also takes place through condensation of aromatic nuclei to form a solid product rich in carbon which is deposited on the catalyst.

These reforming catalysts are extremely sensitive, in addition to coke, to various poisons likely to deteriorate their activity: in particular sulphur, nitrogen, metals and water.

When coke is deposited on the surface of the catalyst, it leads to loss of activity in the course of time which, at higher operating temperatures, produces a lower yield of reformed product and a higher yield of gas.

On this account, and taking into consideration the regeneration of the catalyst, the process of catalytic reforming can be implemented in two different manners: in semi-regenerative or cyclical manner and in continuous manner. In the former, the process is carried out in a fixed bed, and in the latter in a mobile bed.

In the semi-regenerative process, to offset the loss of activity of the catalyst, the temperature is gradually increased, then the installation is stopped to proceed with regenerating the catalyst by eliminating the coke. In cyclical reforming, which is in fact a variant of the semi-regenerative process, the installation comprises several reactors in series and each is put out of operation in turn, the coke deposits are eliminated from the catalyst placed out of circuit and the catalyst is regenerated while the other reactors remain in operation.

In continuous reforming, the reactors used are mobile bed reactors operating at low pressure (less than 15 bars), which allows for considerably improved yields of reformed product and hydrogen by promoting aromatization reactions to the detriment of cracking reactions, coke formation on the other hand being greatly accelerated. The catalyst passes through the reactors then through a regenerating section.

On account of the chemical reactions that take place during reforming processes, a bifunctional catalyst must be used which combines two types of activity: namely the hydrogenating-dehydrogenating activity of a metal, in particular a noble metal such as platinum, possibly associated with other metals such as rhenium or tin, so-called promoter metals, this metal being deposited on the surface of a porous matrix. This matrix of alumina contains a halogen, preferably a chlorine, which provides the necessary acidic function for isomerizations, cyclizations and cracking reactions.

The matrices generally used are chosen from among the refractory oxides of the metals of groups II, II and IV of the periodic table of elements. Aluminium oxide with the general formula $Al_2O_3 \cdot nH_2O$ is most frequently used. Its specific surface area lies between 150 and 400 $m^2/g$. This oxide in which n lies between 0 and 0.6, is conventionally obtained by controlled dehydration of hydroxides in which $1 \leq n \leq 3$. These amorphous hydroxides are themselves prepared by precipitation of aluminium salts in an aqueous medium by alkali salts. Precipitation and maturing conditions determine several forms of hydroxides, the most common being boehmite (n=1), gibbsite and bayerite (n=3). Depending upon hydrothermal treatment conditions, these hydroxides give several oxides or transition aluminas. Their forms are ρ, γ, η, χ, θ, δ, κ and α which distinguish themselves chiefly through the organization of their crystalline structure. During heat treatments, these different forms are likely to inter-evolve in accordance with a complex filiation system which is dependent upon operating conditions. The α form which has a specific surface area and acidity in the region of zero, is the most stable at high temperatures. For catalysts, in particular for reforming catalysts, the γ form of transition alumina is the form most often used as it offers a compromise between its acid properties and thermal stability.

As indicated above, the hydrogenation-dehydrogenation function is preferably provided by a noble metal from group VIII in the periodic table.

Numerous studies have especially examined the dehydrogenating function of these catalysts, and more specifically the type and method of introduction of the promoter metal added to the platinum. The chief effect of this second metal is to promote the dehydrogenating activity of platinum. In some cases, this second metal or promoter also produces the effect of limiting the dispersion loss of platinum atoms on the surface of the support. This dispersion loss is partly responsible for deactivation of the catalyst.

Among all the promoter metals examined, two metals hold a preponderant place: rhenium and tin. It is these two metals which probably obtain the best promotion effects of platinum.

Therefore, the use of rhenium has in particular contributed to increasing the stability of the catalyst vis-à-vis its deactivation through the depositing of coke. This type of catalyst is most often used in fixed bed units. With this increase in stability, it has also been possible to increase the duration of the reaction cycles between two regenerations.

With tin, it has been possible to improve the performance of these catalysts when they are used at low pressure. This improvement in conjunction with their lower cracking activity has led to obtaining improved yields of reformed product especially in continuous regeneration processes operating at low pressure. Catalysts of this type containing rhenium, tin or even lead have been described in particular in U.S. Pat. No. 3,700,588 and U.S. Pat. No. 3,415,737.

For the conversion of hydrocarbons, the catalyst must offer a maximum level of activity but, in addition, must activate this conversion with the greatest possible selectivity. In particular, losses of hydrocarbons in the form of light products containing 1 to 4 atoms of carbon must be limited. The acid function is necessary for reactions producing aromatics and improving octane ratings. Unfortunately, this function is also responsible for cracking reactions which lead to the formation of light products. In consequence, it is evident that optimization of the quality of this acid function is of importance in order to further improve selectivity without, however, reducing the activity of the catalyst.

Catalysts must also be made more stable, that is to say resistant to coke poisoning.

Also, it has been seen that catalysts are used either in fixed bed processes or in mobile bed processes. In the latter, the catalysts undergo a high number of regenerations. These treatments whose action includes, amongst others, burning the coke deposited on the catalyst, are carried out at high temperatures in the presence of steam. Unfortunately, these conditions contribute to deterioration of the catalyst. It is therefore important to seek to increase the resistance of catalysts under such conditions.

Also, these catalysts are in the form of extrudates or beads whose size is sufficient to give relatively easy passage to reagents and gas products. The wear of these catalysts, in particular through friction in the mobile bed units, causes the formation of dust and finer grains. These finer grains disturb gas outflow and necessitate an increase in the entry pressure of the reagents, and even, in some cases, require the operation of the unit to be stopped. Moreover, in mobile bed units, the consequence of this gradual wear is to disturb the circulation of the catalyst and require the frequent topping up with new catalyst.

A catalyst such as a reforming catalyst must therefore meet a high number of requirements of which some may appear to be contradictory. This catalyst must firstly offer the highest possible activity with which high yields can be obtained, but this activity must be combined with the greatest possible selectivity, that is to say that cracking reactions producing light products containing 1 to 4 carbon atoms must be limited.

Also, the catalyst must offer great stability against its deactivation through coke deposit ; the catalyst must also offer excellent resistance to deterioration when subjected to the extreme conditions prevailing in the repeated regeneration operations it must undergo.

In the continuous reforming process using mobile bed reactors, as mentioned above, the catalyses are also subjected to intense gradual wear through friction leading to a substantial reduction in their specific surface area and to the formation of "fines" which are detrimental to the proper functioning of the installation. The catalysts currently available, while they may meet one or more of these conditions, do not fulfil all the requirements mentioned above.

SUMMARY OF THE INVENTION

The object of the invention is therefore to provide a catalyst which offers all the properties set forth above. A further object of the invention is to provide a process for preparing this catalyst by using the starting products commonly used in this technical field, for which simple stages can be easily developed on an industrial level.

These objects, and others, are achieved according to the present invention by a process for the conversion of hydrocarbons into aromatics which includes contacting a load of said hydrocarbons with a catalyst under temperature and pressure conditions adapted to said conversion reaction, such process being characterized in that the catalyst comprises:

a matrix consisting of a mixture of $\eta$ transition alumina, $\gamma$ transition alumina, and at least one doping metal chosen from the group made up of titanium, zirconium, hafnium, cobalt, nickel, zinc and the lanthanides, at least one halogen chosen from the group formed by fluorine, chlorine, bromine and iodine, at least one noble metal from the platinum group, and at least one promoter metal chosen from the group made up of tin, germanium, indium, gallium, thallium, antimony, lead, rhenium, manganese, chromium, molybdenum and tungsten.

DETAILED DESCRIPTION OF THE INVENTION

It is known that in the area of catalysts and in particular in the area of reforming catalysts, $\gamma$ transition alumina is the form most frequently used (see above). According to the invention, the matrix of the catalyst is, in surprising manner, made up of a mixture of $\eta$ alumina and $\gamma$ alumina.

According to the invention, the mixture of $\gamma$ transition alumina and $\eta$ transition alumina may comprise from 0.1 to 99%, preferably from 1 to 84% by weight of $\eta$ alumina, and again preferably this mixture contains from 3 to 70% by weight, or even better between 5 to 50% by weight of $\eta$ transition alumina, the remaining weight percentage up to 100% of the mixture being that of $\gamma$ transition alumina.

$\eta$ transition alumina is obtained by roasting bayerite under dry air at atmospheric pressure between 250 and 500° C., preferably between 300 and 450° C. The specific surface area attained which is related to the final roasting temperature, lies between 300 and 500 m$^2$/g. $\gamma$ alumina is derived from boehmite through roasting under air at a temperature of between 450 and 600° C. The specific surface area of the $\gamma$ alumina obtained lies between 100 and 300 m$^2$/g.

The structures of these transition aluminas are similar but can be differentiated by X-ray diffraction. These structures crystallize in a cubic system of spinel type. The crystalline parameter of the $\eta$ form is a=7.90 Å and c=7.79 Å.

The catalyst prepared in this way, in surprising manner, meets all the requirements set out above for a catalyst. The presence on the alumina matrix of at least one doping metal, chosen from the group comprising titanium, zirconium, hafnium, cobalt, nickel, zinc and the lanthanides, produces the effect, in particular, of protecting the matrix of alumina or aluminas against loss of specific surface area during the different regeneration treatments which the catalyst undergoes, while at the same time maintaining catalytic performances at much the same level, in particular during reforming reactions and the Production of aromatics.

A preferred catalyst of the invention comprises:

a matrix consisting of a mixture of $\eta$ transition alumina and $\gamma$ transition alumina, and relative to the catalyst, from 0.001 to 10% by weight of at least one doping metal chosen from the group comprising titanium, zirconium, hafnium, cobalt, nickel, zinc and the lanthanides, from 0.10 to 15.0% by weight of at least one halogen chosen from the group comprising fluorine, chlorine, bromine and iodine, from 0.01 to 2.00% by weight of at least one noble metal from the platinum group, from 0.005 to 10% by weight of at least one promoter metal chosen from the group made up of tin, germanium, indium, gallium, thallium, antimony, lead, rhenium, manganese, chromium, molybdenum and tungsten.

Another preferred catalyst of the invention comprises:

a support consisting of a mixture of γ alumina and η alumina, of one or several doping metal(s) chosen from the group made up of titanium, zirconium, hafnium, cobalt, nickel, zinc and the lanthanides, at least one halogen, a catalytic metal providing the dehydrogenation function of the catalyst, consisting of one or several noble metal(s) from the platinum group, and at least one promoter metal chosen from the metals mentioned above.

According to the invention, the matrix of aluminas is modified by at least one doping metal chosen from the group made up of titanium, zirconium, hafnium, cobalt, nickel, zinc and the lanthanides.

The group of lanthanides or rare-earth elements is made up of elements of the lanthanum series in Mendeleev's periodic table whose proton numbers lie between 57 and 71. Cerium, neodymium and praseodymium can be given as an example.

According to the invention, the catalyst may comprise one or several of these doping metals and their total content in the catalyst, expressed as weight percent relative to the catalyst, lies between 0.001 and 10% by weight, preferably between 0.005 and 5.0% by weight, and again preferably between 0.05 and 3% by weight, and further preferably between 0.01 and 0.50% by weight.

According to a first embodiment, the doping metal or metals is or are preferably chosen from the lanthanides.

According to a second embodiment, the doping metal or metals is or are chosen from the group made up of titanium, zirconium, hafnium, cobalt, nickel and zinc.

The doping metal content is chosen in particular according to the type of reactor used for implementing the process, with the doping metal content being higher when a mobile bed reactor is used.

The doping metal is preferably zirconium and/or titanium, or the doping metal is lanthanum and/or cerium.

The halogen or halogens used to acidify the support may represent a total of 0.1 to 15% by weight, preferably from 0.2 to 10% by weight of the catalyst. A single halogen is preferably used, in particular chlorine.

The catalyst also comprises one or several promoter metals whose effect is 0 promote the dehydrogenating activity of the noble metal from the platinum group and to limit the dispersion loss of the atoms of the noble metal on the surface of the matrix, which is partly responsible for the deactivation of the catalyst.

The promoter metals are chosen in relation to the method of use of the catalyst.

Therefore, when a catalyst is intended for use with a fixed bed process, the promoter metal is preferably chosen from the group consisting of rhenium, manganese, chromium, molybdenum, tungsten, indium and thallium.

When the catalyst is intended for use with a mobile bed process, the promoter metal is preferably chosen from the group made up of tin, germanium, indium, antimony, lead, thallium and gallium.

Among these, rhenium is also preferred for fixed bed processes and tin for mobile bed processes as they achieve the best promotion of the catalyst activity.

The total content of promoter metal or metals relative to the catalyst is from 0.005 to 10.00% by weight, preferably from 0.01 to 3.00% by weight, and more preferably from 0.01 to 1% by weight.

When the catalyst only contains a single promoter metal, for example rhenium or tin, the weight percentage is preferably from 0.005 to 2.0%, more preferably from 0.005 to 1.5% by weight, better from 0.01 to 0.9% by weight, and even better from 0.01 to 0.8% by weight.

When the doping metal or metals is or are chosen from the group of alkali and alkaline-earth metals, then the content of the single promoter metal is preferably from 0.005 and 0.9% by weight, and more preferably from 0.01 to 0.8% by weight.

The catalyst of the invention also comprises at least one noble metal of the platinum group with a content of between 0.01 and 2.00% by weight, preferably from 0.10 to 0.80% by weight.

The noble metals likely to be used are platinum, palladium, iridium; platinum is preferred.

The catalyst of the invention can be prepared by the depositing of its different constituents on the matrix of aluminas. The depositing of each constituent may be made in whole or in part on one or both of the aluminas of the matrix before or after it is given form. The constituents may be deposited separately or simultaneously in any order.

The catalyst constituents can therefore be deposited on both aluminas or on one of them, preferably on the η alumina before mixing the two aluminas and before they are given form.

It is also possible to deposit in full or in part one or certain constituents on both aluminas or on one of them before they are mixed, and then to make the remaining deposits after mixing the two aluminas, either before or after the mixture is given form. When one or several constituents are deposited before mixing the two aluminas, the doping metal is preferably deposited on the η transition alumina.

However, according to the invention, it is generally preferred to mix the two aluminas before depositing the metal constituents and the halogen or halogens.

Also, according to the invention, the catalyst can be prepared using a process comprising the following stages:

a) preparation by mixing then giving form to a matrix consisting of a mixture of η transition alumina and γ transition alumina, b) depositing, on at least one of the transition aluminas γ and η, of the following constituents in the weight percentages given below which are relative to the total weight of the catalyst, from 0.001 to 10%, preferably from 0.005 to 5.0%, or further preferably from 0.005 to 3% by weight, and better from 0.01 to 0.5% by weight of at least one doping metal chosen from the group consisting of titanium, zirconium, hafnium, cobalt, nickel, zinc and the lanthanides, from 0.1 to 15%, preferably from 0.2 to 10% by weight of at least one halogen chosen from the group consisting of fluorine, chlorine, bromine and iodine, from 0.01 to 2%, preferably from 0.10 to 0.80% by weight of at least one noble metal from the platinum group, and from 0.005 to 10%, preferably from 0.01 to 3.00% by weight, preferably from 0.01 to 1% by weight of at least one promoter metal chosen from the group made up of tin, germanium, indium, gallium, thallium, antimony, lead, rhenium, manganese, chromium, molybdenum and tungsten;

it being possible for stages a) and b) to be carried out in any order, but preferably stage a) is performed before stage b) and the deposits of stage b) may be carried out in part only before stage a), it being possible for them to be carried out in any order.

According to a preferred embodiment of this process, first a support is prepared consisting of the matrix of aluminas and of at least one doping metal, on which is then deposited the promoter metal or metals, the halogen or halogens and the noble metal or metals from the platinum group.

In this case, the doping metal or metals can be deposited on the mixture of aluminas before or after they are given form.

Preferably the doping metal or metals is or are deposited after the matrix of aluminas has been given form.

The depositing of the different constituents of the catalyst can be made using conventional methods, in liquid or gas phase, with appropriate precursor compounds. When the deposit is made on the matrix of aluminas after it has been given form, the methods used may for example be dry impregnation, impregnation by excess solution or ion-exchange. If necessary, this operation is followed by drying and roasting at a temperature of between 300 and 900° C., preferably in the presence of oxygen.

The depositing of the doping metal or metals, chosen from the group made up of titanium, zirconium, hafnium, cobalt, nickel, zinc and the lanthanides, may be carried out using any method, for example dry impregnation, impregnation by excess solution or ion-exchange and may be performed at any stage of the catalyst preparation process. When this deposit is made after the matrix of aluminas has been given form, preferable use is made of impregnation in an aqueous medium by excess solution, followed by drying to eliminate the impregnation solvent, and roasting under air at a temperature of between 300 and 900° C. for example.

These doping metals may be deposited through the intermediary of compounds such as, for example, the oxides, halides, oxyhalides, nitrates, carbonates, sulfates or oxalates of said elements. In the case of zirconium, the alcoholates and acetyl acetonates can also be used.

The depositing of the noble metal or metals from the platinum group may also be made by conventional methods, in particular impregnation using a solution, whether aqueous or not, containing a salt or a compound of the noble metal. By way of illustration, among the salts or compounds which can be used, mention can be made of chloroplatinic acid, ammoniated compounds, ammonium chloroplatinate, dicarbonyl platinum dichloride, hexahydroxyplatinic acid, palladium chloride and palladium nitrate.

In the case of platinum, the ammoniated compounds may for example be the hexamine salts of platinum IV with the formula $Pt(NH_3)_6X_4$, the halogenopentamine salts of platinum IV with the formula $(PtX(NH_3)_5)X_3$, the tetrahalogenodiamine salts of platinum with the formula $PtX_4(NH_3)_2X$, the platinum complexes with halogens-polyketones and the halogenated compounds of formula $H(Pt(aca)_2X)$ in which the X element is a halogen chosen from the group made up of chorine, fluorine, bromine and iodine, and preferably chlorine, and the aca group represents the remainder of the formula $C_5H_7O_2$ derived from the acetylacetone. The introduction of the noble metal from the platinum group is preferably made by impregnation using an aqueous or organic solution of one of the organometallic compounds mentioned above. Among the organic solvents that can be used, mention can be made of paraffin, naphthene or aromatic hydrocarbons, and the halogenated organic compounds having for example 1 to 12 carbon atoms per molecule. For example n-heptane, methylcyclohexane, toluene and chloroform can be mentioned. Solvent mixtures may also be used.

After the introduction of the noble metal, drying and roasting is preferably carried out, for example at a temperature of between 400 and 700° C.

The depositing of the noble metal or metals from the platinum group may be made at any time during the preparation of the catalyst. It may be made alone or simultaneously with the depositing of other constituents, for example of the promoter metal or metals. In this latter case, a solution containing all the constituents to be introduced simultaneously may be used for impregnation.

The depositing of the promoter metal or metals may also be made by conventional methods using precursor compounds such as the halides, nitrates, acetates, tartrates, citrates, carbonates and oxalates of these metals. Any other salt or oxide of these metals which is soluble in water, acids or in another appropriate solvent, is also suitable as a precursor. Examples of such precursors are rhenates, chromates, molybdates and tungstates. The promoter metal or metals can also be introduced by mixing an aqueous solution of their precursor compound or compounds with the alumina or aluminas before the matrix is given form, followed by roasting with air at a temperature of between 400 and 900° C.

The introduction of the promoter metal or metals can also be made using a solution of an organometallic compound of said metals in an organic solvent. In this case, this deposit is preferably made after that of the noble metal(s) from the platinum group and roasting of the solid, possibly followed by hydrogen reduction at high temperature, for example between 300 and 500° C. The organometallic compounds are chosen from the group consisting of the complexes of said promoter metal, in particular the polyketonic complexes and the hydrocarbylmetals such as alkyl, cycloalkyl, aryl, alkylaryl and arylalkyl metals. Organohalogenated compounds may also be used. Particular mention can be made of tin tetrabutyl if the promoter metal is tin, lead tetraethyl if the promoter metal is lead and indium triphenyl if the promoter metal is indium. The impregnation solvent may be chosen from the group made up of the paraffin, naphthene or aromatic hydrocarbons containing 6 to 12 carbon atoms per molecule and the halogenated organic compounds containing from 1 to 12 carbon atoms per molecule. Examples which can be given are n-heptane, methylcyclohexane and chloroform. Mixtures of the above-described solvents can also be used.

The halogen, for example chlorine, may be introduced into the catalyst at the same time as another metallic constituent, for example in cases when a halide is used as precursor compound for the metal from the platinum group, for the promoter metal or the doping metal. This introduction can also be made by impregnation with an aqueous solution containing an acid or a halogenated salt. For example, chlorine may be deposited using a solution of hydrochloric acid. The chlorine may also be introduced by roasting the catalyst at a temperature of between 400 and 900° C. for example, in the presence of an organic compound containing the halogen such as for example $CCl_4$, $CH_2Cl_2$ and $CH_3Cl$.

Evidently, at least two constituents of the catalyst may be introduced simultaneously, for example using a solution comprising their precursor compounds. The constituents may also be introduced successively in any order, using separate solutions. In the latter case, intermediate drying and/or roasting can be carried out.

The matrix of alumina or mixture of aluminas may be given form using catalyst forming techniques known to those skilled in the art such as for example: extrusion, drop coagulation, pelleting, spray drying or pastille formation.

In preferred manner a preparation process according to the invention, which is detailed below, comprises the following successive stages:

a) giving form to the matrix consisting or a mixture of γ alumina and η alumina, b) depositing on this matrix at least one doping metal chosen from the group made up of titanium, zirconium, hafnium, cobalt, nickel, zinc and the lanthanides, c) depositing at least one promoter metal chosen from among tin, germanium, indium, gallium, thallium, antimony, lead, rhenium, manganese, chromium, molybdenum and tungsten, d) introduction of at last one element chosen from the group consisting of fluorine, chlorine, bromine and iodine, and e) depositing at least one noble metal from the platinum group.

After shaping the matrix into form and depositing all the constituents, the final heat treatment between 300 and 1000° C. can be carried out which may only comprise one stage preferably at a temperature of between 400 and 900° C., an under oxygen containing atmosphere, preferably in the presence of free oxygen or air. This treatment generally corresponds to the drying-roasting procedure after the depositing of the final constituent.

After giving form to the matrix and depositing all the constituents, an additional heat treatment is preferably carried out which may be made at a temperature of between 300 and 1000° C., preferably between 400 and 700° C., in a gaseous atmosphere containing steam and possibly a halogen such as chlorine.

This treatment may be conducted in a bed crossed by a gas flow or in a static atmosphere. The gaseous atmosphere preferably contains water and possibly at least one halogen. The molar water content lies between 0.05 and 100%, preferably between 1 and 50%. The molar halogen content lies between 0 and 20%, preferably between 0 and 10%, and further preferably between 0 and 2%. The duration of this treatment is variable depending upon temperature conditions, partial water pressure and amount of catalyst. This value lies advantageously between one minute and 30 hours, preferably between 1 and 10 hours. The gaseous atmosphere used has for example an air, oxygen or inert gas base such as argon or nitrogen.

The role played by this high temperature treatment in the presence of water is important. As will be shown in the examples given below, the presence so at least one element from the group consisting of titanium, zirconium, hafnium, cobalt, nickel, zinc and the lanthanides protects the alumina matrix against loss of specific surface area during the different regeneration treatments. In unexpected manner, severe heat treatment in the presence of water and possibly a halogen applied to this type of catalyst containing at least one element from the group consisting of titanium, zirconium, hafnium, cobalt, nickel, zinc and the lanthanides not only produces the effect of maintaining the least loss of specific surface area, but also of significantly improving catalytic performance during reforming reactions and aromatic production as compared with catalysts of the prior art prepared according to processes which do not include the final stage of high temperature treatment in the presence of water and of at least one halogen, preferably chlorine.

After being prepared according to the invention, the roasted catalyst may advantageously be subjected to activation treatment under hydrogen at high temperature, for example between 300 and 550° C. The procedure for treatment under hydrogen consists of, for example, a slow rise in temperature under a flow of hydrogen until the maximum reduction temperature is reached, which generally lies between 300 and 550° C., preferably between 350 and 450° C., followed by the maintaining of this temperature for a period which generally ranges between 1 and 6 hours.

According to the invention, the above-described catalyst is used for hydrocarbon conversion reactions, and more particularly for petrol reforming processes and the production of aromatics.

Reforming processes bring an increase in the octane number of petrol fractions from the distillation of crude oil and/or other refining processes.

Production processes of aromatics supply the bases (benzene, toluene and xylene) for use in petrochemistry. These processes offer additional interest by contributing to the production of substantial quantities of hydrogen which is indispensable for refinery hydrotreatment processes.

These two processes differ in the choice of operating conditions and load composition.

The typical load treated by these processes contains paraffin, naphthene and aromatic hydrocarbons containing from 5 to 12 carbon atoms per molecule. This charge is determined, among others, by its density and weight composition.

To implement these processes, the hydrocarbon load is placed in contact with the catalyst of the present invention under appropriate conditions, for example at a temperature of between 400 and 700° C., with a pressure ranging from atmospheric pressure to 4 Mpa, using the mobile bed or fixed bed method.

Generally, contact is carried out with a mass flow of charge treated per unit of catalyst mass and per hour in the range of 0.1 to 10 kg/kg.h. Operating pressure may be set between atmospheric pressure and 4 Mpa. When a fixed bed is used, pressure is preferably from 1 to 2 Mpa, and when a mobile bed is used, pressure is preferably from 0.1 to 0.9 Mpa.

Part of the hydrogen produced is recycled according to a molar recycling rate ranging from 0.1 to 8. The rate is the ratio of flow of recycled hydrogen over load flow.

Other characteristics and advantages of the invention will be more clearly understood upon reading the following examples, which are evidently given by way of illustration and are not restrictive.

The invention will now be described in the following examples of embodiment given as a non restrictive illustration.

EXAMPLE 1 preparation of a catalyst according to the invention comprising a matrix made up of a mixture of γ alumina and η alumina on which titanium, platinum, rhenium and chlorine are deposited a) forming the alumina matrix The matrix is prepared by mechanically mixing a powder of γ alumina having a specific surface area of $220m^2/g$ with a powder of η alumina having a specific surface area of 320 m²/g previously prepared by roasting bayerite. The proportion of η alumina is 30% by weight. The mixture is then given form by extrusion. The extruded matrix is roasted under a dry air flow at 520° C. for 3 hours.

b) depositing of titanium

After cooling, the matrix obtained in stage a) is placed in contact with an aqueous solution of decahydrated titanium oxalate $Ti_2(C_2O_4)3, 10H_2O$. The concentration of this solution is 14.1 g of titanium per liter. This contact is made at room temperature for 1 h. The impregnated extrudates are then dried at 120° C. for 15 h and roasted at 530° C. under a humid air flow for 20 h. The partial pressure of water is 0.07 Mpa.

c)d)e) Depositing of platinum, rhenium and chlorine

Platinum, rhenium and chlorine are deposited on part of the support obtained in stage b).

The platinum is deposited during an initial impregnation of the support using an aqueous solution containing per liter:

8.20 g of chlorine in HCl form, 1.00 g of platinum in $H_2PtCl_6$ form.

The solution is left in contact with the support for 2 h. After draining and drying for 4 h at 120° C., the impregnated support is roasted at 530° C. for 3 h under a dry air flow. The rhenium is then deposited by a second impregnation with an aqueous solution containing per liter:

4.20 g of chlorine in HCl form, 1.50 g of rhenium in $ReCl_3$ form.

After drying, the impregnated support is roasted at 530° C. for 2 h under a flow of dry air.

f) Heat treatment in the presence of water and chlorine

The product obtained after stages c) d) e) above is treated at 510° C. for 2 h under a flow of 2000 dm³/h of air per 1 kg of solid. This air contains water and chlorine injected into a preheating area located above the bed of the solid. The molar concentrations of water and chlorine are respectively 1% and 0.05%.

EXAMPLE 2

Preparation of a catalyst according to the invention comprising a matrix of γ alumina and η alumina on which are deposited zirconium, platinum, rhenium and chlorine.

a) Forming the matrix

The alumina matrix is prepared in the same manner as in example 1, stage a) by mechanically mixing a powder of γ alumina and a powder of η alumina, extrusion and roasting.

b) Depositing of zirconium

The matrix obtained in stage a) is placed in contact with an aqueous soluion of zirconyl chloride $ZrOCl_2, 8H_2O$. The concentration of this solution is 26.7 g of zirconium per liter. This contact is made at room temperature for 2 h. The extrudates are then dried at 120° C. for 15 h and roasted at 530° C. under a flow of dry air for 2 h.

c)d)e) Depositing of platinum, rhenium and chlorine

The depositing of platinum, rhenium and chlorine is made on the product obtained in stage b) above in exactly the same manner as in example 1 stage c).

f) Heat treatment in the presence of water and chlorine

The product obtained subsequent to stages c)d)e) above is treated in exactly the same manner as in example 2.

EXAMPLE 3 (Comparative)

In this example, much the same operating method is followed as in Example 1, but in stage a) only γ alumina is used, no titanium or zirconium are deposited, and no final hydrothermal treatment is carried out.

a) Forming the matrix

The matrix is prepared by extruding a powder of γ alumina whose specific surface area is 220 m²/g. The extruded matrix is then roasted in a flow of dry air at 520° C. for 3 h.

b) Depositing of platinum, rhenium and chlorine

The depositing of platinum, rhenium and chlorine is made on the matrix obtained subsequent to stage a) above in exactly the same manner as in stages c)d)e) of examples 1) and 2).

The characteristics of the catalysts thus prepared are grouped together under table I below.

TABLE I

| Catalyst | proportion η alumina (weight %) | platinum content (weight %) | rhenium content (weight %) | chlorine content (weight %) | titanium content (weight %) | zirconium content (weight %) | specific surf. area (m²/g) |
|---|---|---|---|---|---|---|---|
| Ex. 3 | 0 | 0.23 | 0.25 | 1.12 | 0 | 0 | 216 |
| Ex. 1 | 30 | 0.22 | 0.22 | 1.09 | 0.085 | 0 | 245 |
| Ex. 2 | 30 | 0.24 | 0.23 | 1.10 | 0 | 0.13 | 243 |

EXAMPLE 4

Performance of catalysts:

The catalysts prepared above in examples 1, 2 and 3 were tested by conversion of a load with the following characteristics:

| | |
|---|---|
| volume mass at 20° C. | 0.742 kg/dm³ |
| research octane number = | 41 |
| paraffin content | 52.2 wt % |
| naphtene content | 32.4 wt % |
| aromatic content | 15.4 wt % |

The following operating conditions were used:

| | |
|---|---|
| temperature | 485° C. |
| total pressure | 1.3 Mpa |
| mass flow of load (en kg.h⁻¹) per kilogram of catalyst | 1.0 h⁻¹ |

Catalyst performances are given in Table II below, and are expressed as weight yield and the research octane number of the reformed product.

TABLE II

| Catalyst | yield reformed product (wt %) | hydrogen yield (weight %) | aromatic yield (weight %) | C4 yield (weight %) | C4 aromatics |
|---|---|---|---|---|---|
| Example 3 | 85.7 | 3.0 | 59.1 | 11.3 | 0.19 |
| Example 1 | 86.5 | 3.1 | 59.5 | 10.4 | 0.18 |
| Example 2 | 87.1 | 3.2 | 59.7 | 9.7 | 0.16 |

If the performances of the catalysts in examples 1 and 3 are compared and those of the catalysts in examples 2 and 3 are compared, it is found that the performances of the catalysts in examples 1 and 2 used in a process according to the invention shows a distinct improvement compared with the catalyst in example 3 which represents the prior art.

The yields of light products from C4 cracking obtained during the test of the two catalysts in examples 1 and 2 used in a process according to the invention are very significantly lower than those observed with the comparative catalyst in example 3.

It can be seen that the ratio of the yields of C4 cracking products over the yields of aromatic compounds, called C4/aromatics in the above table, is lower for the two catalysts in examples 1 and 2 used in a process according to the invention. The selectivity of the catalysts for the desired aromatic products will increase as this ratio decreases.

The catalysts of examples 1 ani 2 used in a process according to the invention, which compared with the comparative catalyst of example 3 also contain $\eta$ alumina, titanium and zirconium respectively, and which have been advantageously subjected to heat treatment in the presence of water and chlorine, offer improved characteristics compared with the comparative catalyst of example 3, in particular lower selectivity for cracking products, and therefore improved selectivity for aromatic products.

The following examples 1A to 4A also illustrate the invention.

EXAMPLE 1A

Preparation of a catalyst according to the invention comprising a matrix consisting of a mixture of $\gamma$ alumina and $\eta$ alumina on which lanthanum, platinum, rhenium and chlorine are deposited.

a) Forming the alumina matrix

The matrix is prepared by mechanically mixing a powder of $\gamma$ alumina having a specific surface area of 220 m²/g with a powder of $\eta$ alumina having a specific surface area of 320 m²/g previously prepared by roasting bayerite. The proportion of $\eta$ alumina is 40% by weight. The mixture is then formed by extrusion. The extruded matrix is roasted under a dry air flows at 520° C. for 3 hours.

b) Depositing of lanthanum

After cooling, the matrix obtained in stage a) is placed in contact with an aqueous solution of hexahydrated lanthanum nitrate $La(NO_3)_2, 6H_2O$. The concentration of this solution is 32.0 g of lanthanum per liter. This contact is carried out at room temperature for 1 h. The support impregnated in this way is then dried at 120° C. for 15 h and roasted at 530° C. under a flow of dry air for 2 h.

c)d)e) Depositing of platinum, rhenium and chlorine

Platinum, rhenium and chlorine are deposited on part of the support obtained in stage b).

The platinum is deposited during an initial impregnation of the support using an aqueous solution containing per liter:

8.20 g of chlorine in HCl form, 1.00 g of platinum in $H_2PtCl_6$ form.

The solution is left in contact with the support for 2 h. After draining and drying for 4 h at 120° C., the impregnated support is roasted at 530° C. for 3 h under a flow of dry air. The rhenium is then deposited by second impregnation with an aqueous solution containing per liter:

4.20 g of chlorine in HCl form, 1.50 g of rhenium in $ReCl_3$ form.

After drying, the impregnated support is roasted at 530° C. for 2 h under a flow of dry air f) Heat treatment in the presence of water and chlorine The product obtained after stages c)d)e) above is treated at 510° C. for 2 h under a flow of 2000 dm³/h air per 1 kg of solid. This air contains water and chlorine injected into a preheating area located above the solid bed. The water and chlorine molar concentrations are respectively 1% and 0.05%.

EXAMPLE 2A

Preparation of a catalyst according to the invention comprising a matrix of $\gamma$ alumina and $\eta$ alumina on which cerium, platinum, rhenium and chlorine are deposited.

a) Forming the matrix

The alumina matrix is prepared in the same manner as in example 1A, stage a) by mechanically mixing a powder of $\gamma$ alumina and a powder of $\eta$ alumina, extrusion and roasting.

b) Depositing of cerium

The matrix obtained in stage a) is placed in contact with an aqueous solution of hexahydrated cerium nitrate $Ce(NO_3)_3, 6H_2O$. The concentration of this solution is 32.3 g of cerium per liter. This contact is carried out at room temperature for 1 h. The extrudates are then dried at 120° C. for 15 h and roasted at 530° C. under a flow of dry air for 2 h.

c)d)e) Deposing of platinum, rhenium and chlorine

Platinum, rhenium and chlorine are deposited on the product obtained after stage b) above in exactly the same manner as in example 1A stage c).

f) Heat treatment in the presence of water and chlorine

The product obtained subsequent to stages c)d)e) above is treated in exactly the same manner as in example 2A.

EXAMPLE 3A (COMPARATIVE)

In this example, much the same operating method is followed as in example 1A, but in stage a) only $\gamma$ alumina is used, no lanthanum or cerium is deposited, and no final heat treatment is carried out.

a) Forming the matrix

The matrix is prepared by extruding a powder of $\gamma$ alumina whose specific surface area is 220 m²/g. The extruded matrix is then roasted in a flow of dry air at 520° C. for 3 h.

b) Depositing of platinum, rhenium and chlorine

Platinum, rhenium and chlorine are deposited on the matrix obtained subsequent to stage a) above in exactly the same manner as in stage c)d)e) of examples 1A) and 2A).

The characteristics of the catalysts prepared in this way are shown in Table IA below:

TABLE IA

| Catalyst | proportion η alumina (weight %) | platinum content (weight %) | rhenium content (weight %) | chlorine content (weight %) | lanthanum content (weight %) | cerium content (weight %) | specific surf. area (m$^2$/g) |
|---|---|---|---|---|---|---|---|
| Ex. 3A | 0 | 0.23 | 0.35 | 1.12 | 0 | 0 | 216 |
| Ex. 1A | 40 | 0.21 | 0.32 | 1.15 | 0.21 | 0 | 245 |
| Ex. 2A | 40 | 0.22 | 0.34 | 1.14 | 0 | 0.23 | 243 |

EXAMPLE 4A

Performance of catalysts:

The catalysts prepared above in examples 1A, 2A and 3A were tested by converting a load with the following characteristics:

| | |
|---|---|
| volume mass at 20° C. | 0.742 kg/dm$^3$ |
| research octane number = | 41 |
| paraffin content | 52.2 wt % |
| naphthene content | 32.4 wt % |
| aromatic content | 15.4 wt % |

The following operating conditions were used:

| | |
|---|---|
| temperature | 495° C. |
| total pressure | 1.5 Mpa |
| mass flow of load (in kg.h$^{-1}$) per kilogram of catalyst | 2.0 h$^{-1}$ |

The performances of the catalysts are given in Table IIA below, and are expressed as weight yields and the research octane number of the reformed product.

TABLE IIA

| Catalyst | yield reformed product (weight %) | hydrogen yield (weight %) | aromatic yield (% weight) | C4 yield (weight %) | C4 aromatics |
|---|---|---|---|---|---|
| Example 3A | 84.2 | 3.0 | 58.5 | 12.8 | 0.22 |
| Example 1A | 85.6 | 3.2 | 58.3 | 11.2 | 0.19 |
| Example 2A | 85.0 | 3.2 | 58.4 | 11.8 | 0.20 |

If the performances of the catalysts in examples 1A and 3A are compared and the performances of the catalysts in examples 2A and 3A are compared, it is found that the catalysts in examples 1A and 2A used in a process according to the invention show a significant improvement in performance compared with the catalyst in example 3A which represents the prior art.

The yields of light products from C4 cracking obtained during testing of the two catalysts in examples 1A and 2A used in a process according to the invention are very significantly lower than those observed for the comparative catalyst in example 3A.

Therefore, it can be seen that the ratio of the yields of C4 cracking products over the yields of aromatic compounds, termed C4/aromatics in the above table, is lower for the two catalysts of examples 1A and 2A used in a process according to the invention. The selectivity of the catalysts for the desired aromatic products increases as this ratio decreases.

The catalysts of examples 1A and 2A used in a process according to the invention, additionally containing η alumina, lanthanum and cerium respectively compared with the comparative catalyst of example 3A, and having been advantageously subjected to heat treatment in the presence of water and chlorine, offer improved characteristics compared with the comparative catalyst in example 3A, in particular lower selectivity for cracking products, and therefore improved selectivity for aromatic products.

We claim:

1. A process for the conversion of hydrocarbons into aromatic compounds, comprising contacting a composition comprising hydrocarbons with a catalyst under temperature and pressure conditions to produce aromatic compounds, wherein the catalyst comprises:
    a matrix comprising a mixture of η transition alumina and γ transition alumina, comprising 30 to 40% by weight of the η transition alumina; and, based on the total weight of the catalyst:
    from 0.001 to 10% of at least one doping metal selected from the group consisting of titanium, zirconium, hafnium, cobalt, nickel, zinc and the lanthanides,
    from 0.10 to 15% of at least one halogen selected from the group consisting of fluorine, chlorine, bromine and iodine,
    from 0.01 to 2.00% of at least one noble metal selected from the platinum group, and
    from 0.05 to 10.00% of at least one promoter metal selected from the group consisting of tin, germanium, indium, gallium, thallium, antimony, lead, rhenium, manganese, chromium, molybdenum and tungsten.

2. A process according to claim 1, wherein the halogen content of the catalyst is from 0.2 to 10% by weight.

3. A process according to claim 1, wherein the total noble metal content of the catalyst is from 0.1 to 0.8% by weight.

4. A process according to claim 1, wherein the promoter metal is selected from the group consisting of tin, germanium, indium, antimony, lead, thallium, gallium and mixtures thereof.

5. A process according to claim 4, wherein the promoter metal is tin.

6. A process according to claim 1, wherein the promoter metal is selected from the group consisting of rhenium, manganese, chromium, molybdenum, tungsten, indium, thallium and mixtures thereof.

7. A process according to claim 6, wherein the promoter metal is rhenium.

8. A process according to claim 1, wherein said at least one doping metal is selected from the group consisting of the lanthanides.

9. A process according to claim 1, wherein said at least one doping metal is selected from the group consisting of titanium, zirconium, hafnium, cobalt, nickel and zinc.

10. A process according to claim 8, wherein the doping metal is lanthanum and/or cerium.

11. A process according to claim 9, wherein the doping metal is zirconium and/or titanium.

12. A process according to claim 1, wherein the halogen is chlorine.

13. A process according to claim 1, wherein the noble metal is platinum.

14. A process according to claim 1, wherein, prior to contacting the catalyst with the composition, the catalyst is thermally treated for a period of from 1 minute to 30 hours under a gaseous atmosphere comprising water, wherein the molar content of the water in the gaseous atmosphere is from 0.05 to 100%.

15. A process according to claim 14, wherein the gaseous atmosphere further comprises at least one halogen, and the molar content of the halogen in the gaseous atmosphere is at most 20%.

16. A process according to claim 1, wherein the composition comprises paraffins, naphthenes and aromatic hydrocarbons having 5 to 12 atoms of carbon, and the composition is contacted with the catalyst at a temperature of from 400 to 700° C. and at a pressure from atmospheric pressure to 4 MPa.

17. A process according to claim 6, wherein the pressure is from 1 to 2 MPa.

18. A process according to claim 4, wherein the pressure is from 0.1 to 0.9 MPa.

19. A process according to claim 16, wherein the composition is contacted with the catalyst with a mass flow rate of the composition in the range of 0.1 to 10 kg of composition per kg of catalyst and per hour.

20. A process according to claim 1, wherein the conversion of the hydrocarbons to the aromatic compounds is a reforming reaction.

21. A process according to claim 1, wherein said catalyst is prepared by a method comprising:

depositing a compound comprising said at least one doping metal onto said $\eta$ transition alumina and/or said $\gamma$ transition alumina;

depositing a compound comprising said at least one halogen onto said $\eta$ transition alumina and/or said $\gamma$ transition alumina;

depositing a compound comprising said at least one noble metal onto said $\eta$ transition alumina and/or said $\gamma$ transition alumina;

depositing a compound comprising said at least one promoter metal onto said $\eta$ transition alumina and/or said $\gamma$ transition alumina;

forming said mixture of said $\eta$ transition alumina and said $\gamma$ transition alumina; and drying and roasting at a temperature of between 300 and 900° C., in the presence of oxygen.

22. A catalyst for the conversion of hydrocarbons into aromatic compounds, comprising:

a matrix comprising a mixture of $\eta$ transition alumina and $\gamma$ transition alumina, comprising 30 to 40% by weight of the $\eta$ transition alumina; and, based on the total weight of the catalyst:

from 0.001 to 10% of at least one doping metal selected from the group consisting of titanium, zirconium, hafnium, cobalt, nickel, zinc and the lanthanides, from 0.10 to 15% of at least one halogen selected from the group consisting of fluorine, chlorine, bromine and iodine, from 0.01 to 2.00% of at least one noble metal selected from the platinum group, and from 0.05 to 10.00% of at least one promoter metal selected from the group consisting of tin, germanium, indium, gallium, thallium, antimony, lead, rhenium, manganese, chromium, molybdenum and tungsten.

23. The catalyst of claim 22, wherein said catalyst is prepared by a method comprising:

depositing a compound comprising said at least one doping metal onto said $\eta$ transition alumina and/or said $\gamma$ transition alumina;

depositing a compound comprising said at least one halogen onto said $\eta$ transition alumina and/or said $\gamma$ transition alumina;

depositing a compound comprising said at least one noble metal onto said $\eta$ transition alumina and/or said $\gamma$ transition alumina;

depositing a compound comprising said at least one promoter metal onto said $\eta$ transition alumina and/or said $\gamma$ transition alumina;

forming said mixture of said $\eta$ transition alumina and said $\gamma$ transition alumina; and drying and roasting at a temperature of between 300 and 900° C., in the presence of oxygen.

* * * * *